US010055888B2

(12) United States Patent
Christen et al.

(10) Patent No.: US 10,055,888 B2
(45) Date of Patent: Aug. 21, 2018

(54) PRODUCING AND CONSUMING METADATA WITHIN MULTI-DIMENSIONAL DATA

(71) Applicant: Microsoft Technology Licensing, LLC, Redmond, WA (US)

(72) Inventors: Jonathan Christen, Bothell, WA (US); John Charles Howard, Redmond, WA (US); Marcus Tanner, Redmond, WA (US); Ben Sugden, Woodinville, WA (US); Robert C. Memmott, Bellevue, WA (US); Kenneth Charles Ouellette, Sammamish, WA (US); Alex Kipman, Redmond, WA (US); Todd Alan Omotani, Redmond, WA (US); James T. Reichert, Jr., Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 197 days.

(21) Appl. No.: 14/698,514

(22) Filed: Apr. 28, 2015

(65) Prior Publication Data

US 2016/0321841 A1  Nov. 3, 2016

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC ..... G06T 19/006; G06T 13/20; G02B 27/017; G02B 2027/0134; G02B 2027/0138;
(Continued)

(56) References Cited

U.S. PATENT DOCUMENTS 5,659,691 A    8/1997 Durward et al.
6,683,613 B1 * 1/2004 Herbstman ............. G06T 15/40
                                                              345/475

(Continued)

OTHER PUBLICATIONS

"Commandos: Behind Enemy Lines", developed by Pyro Studios, published on Aug. 28, 1998. http://store.steampowered.com/app/6800.*

(Continued)

*Primary Examiner* — Xiao Wu
*Assistant Examiner* — Chong Wu
(74) *Attorney, Agent, or Firm* — Alleman Hall Creasman & Tuttle LLP

(57) ABSTRACT

A computing system and method for producing and consuming metadata within multi-dimensional data is provided. The computing system comprising a see-through display, a sensor system, and a processor configured to: in a recording phase, generate an annotation at a location in a three dimensional environment, receive, via the sensor system, a stream of telemetry data recording movement of a first user in the three dimensional environment, receive a message to be recorded from the first user, and store, in memory as annotation data for the annotation, the stream of telemetry data and the message, and in a playback phase, display a visual indicator of the annotation at the location, receive a selection of the visual indicator by a second user, display a simulacrum superimposed onto the three dimensional environment and animated according to the telemetry data, and present the message via the animated simulacrum.

18 Claims, 9 Drawing Sheets

(51) Int. Cl.
*G06F 3/01* (2006.01)
*G06F 17/24* (2006.01)

(52) U.S. Cl.
CPC .............. *G06F 3/013* (2013.01); *G06F 3/017* (2013.01); *G06F 17/241* (2013.01); *G02B 2027/014* (2013.01); *G02B 2027/0134* (2013.01); *G02B 2027/0138* (2013.01); *G02B 2027/0178* (2013.01); *G02B 2027/0187* (2013.01); *G06T 2219/004* (2013.01)

(58) Field of Classification Search
CPC ...... G02B 2027/014; G02B 2027/0178; G02B 2027/0187; G06F 3/013; G06F 17/241
See application file for complete search history.

(56) References Cited

U.S. PATENT DOCUMENTS

| | | | |
|---|---|---|---|
| 8,554,307 B2 | 10/2013 | Razzaque et al. | |
| 8,587,583 B2 | 11/2013 | Newcombe et al. | |
| 8,922,481 B1 | 12/2014 | Kauffmann et al. | |
| 2004/0233171 A1 | 11/2004 | Bell et al. | |
| 2006/0028400 A1 | 2/2006 | Lapstun et al. | |
| 2009/0179895 A1 | 7/2009 | Zhu et al. | |
| 2012/0127284 A1* | 5/2012 | Bar-Zeev | G02B 27/017 348/53 |
| 2012/0249544 A1* | 10/2012 | Maciocci | G06F 3/011 345/419 |
| 2013/0187835 A1 | 7/2013 | Vaught et al. | |
| 2014/0204117 A1* | 7/2014 | Kinnebrew | G06T 19/006 345/633 |
| 2014/0361988 A1 | 12/2014 | Katz et al. | |
| 2016/0133230 A1* | 5/2016 | Daniels | G06T 19/006 345/633 |

OTHER PUBLICATIONS

Feiner, et al., "Knowledge-based Augmented Reality", In Proceedings of Communications of the ACM, vol. 36 No. 7, Jul. 1993, pp. 53-62.
Slambekova, Dana, "Gaze and Gesture Based Object Interaction in Virtual World", In Proceedings of Doctoral Dissertation, May 2012, 54 pages.
Assenmacher, et al., "Interactive Data Annotation in Virtual Environments", In Proceedings of the 12th Eurographics conference on Virtual Environments, May 8, 2006, 2 pages.
Rose, et al., "Annotating Real-World Objects Using Augmented Reality", In Technical report ECRC-94-41, Jun. 1995, 21 pages.
Toyama, et al., "A Natural Interface for Multi-focal Plane Head Mounted Displays Using 3D Gaze", In Proceedings of International Working Conference on Advanced Visual Interfaces, May 27, 2014, 8 pages.

* cited by examiner

Recording Phase

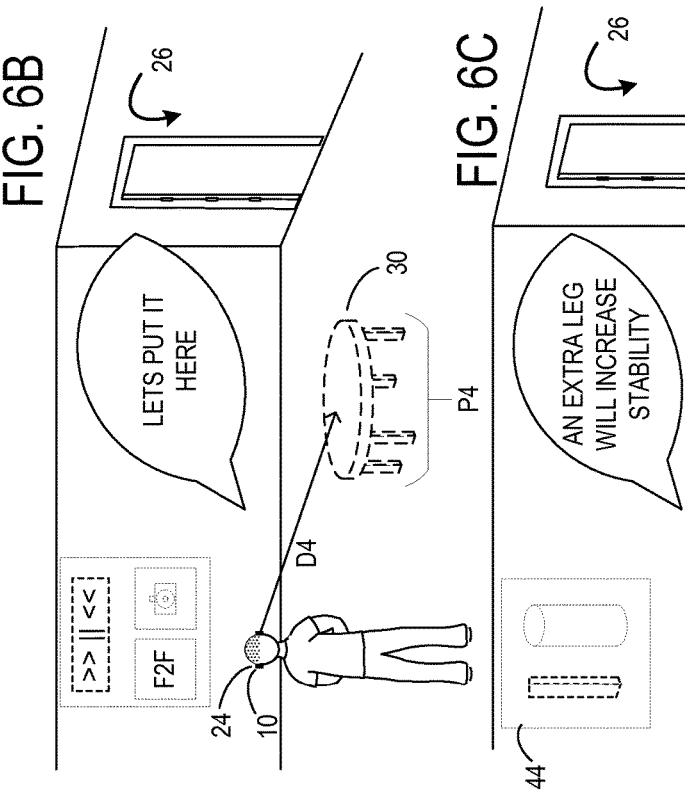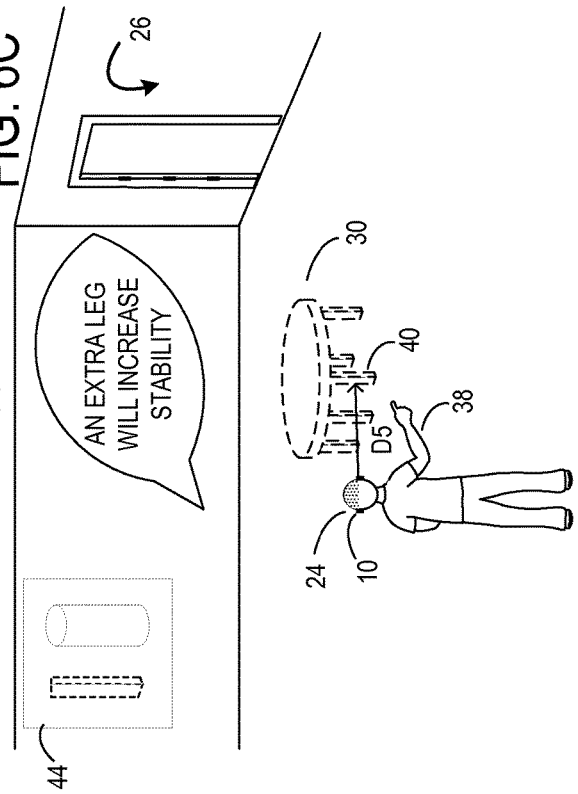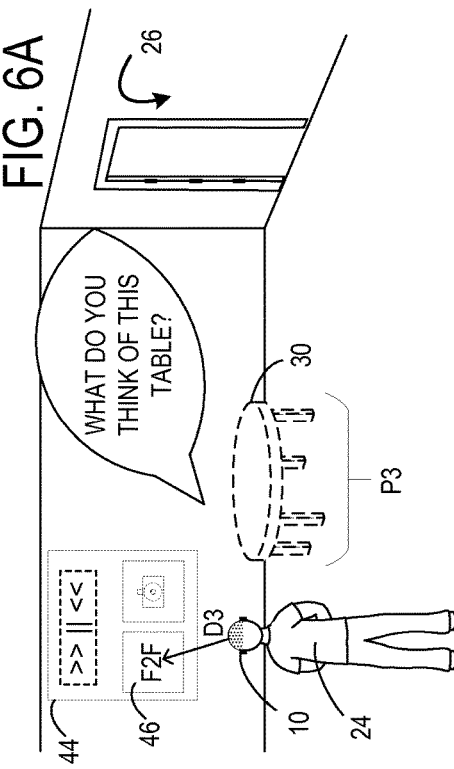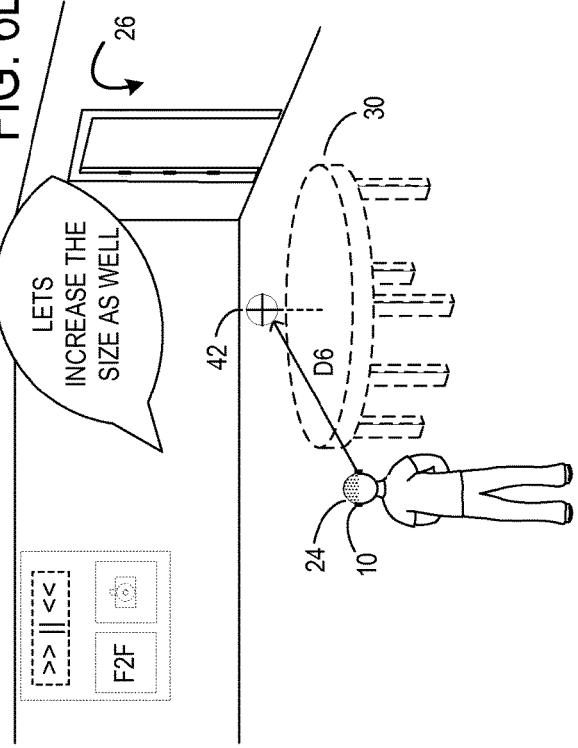

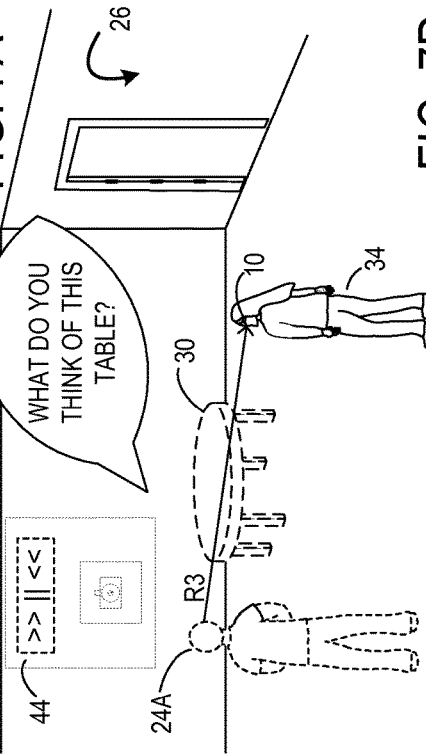
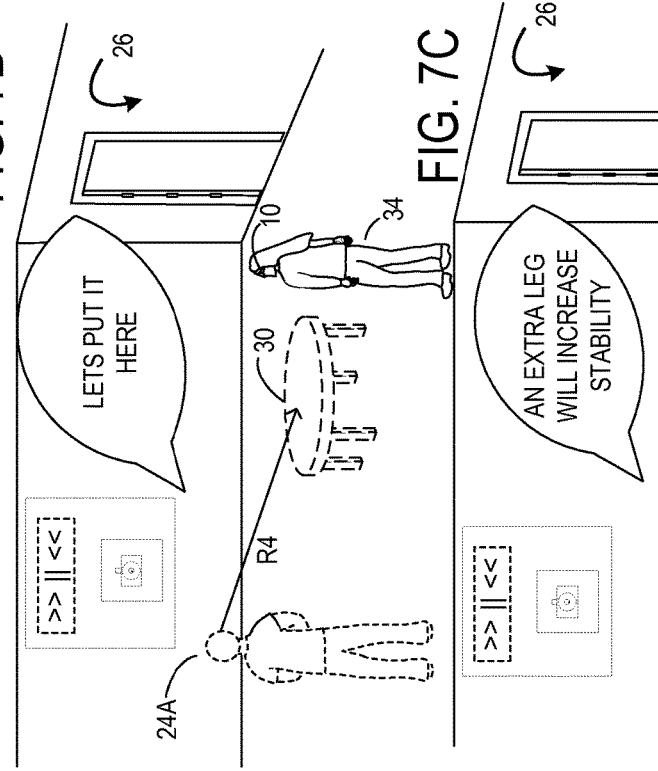
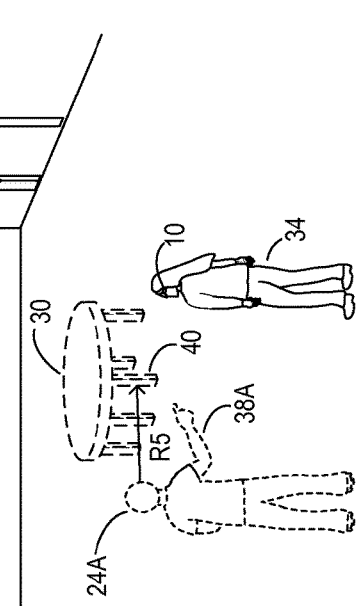
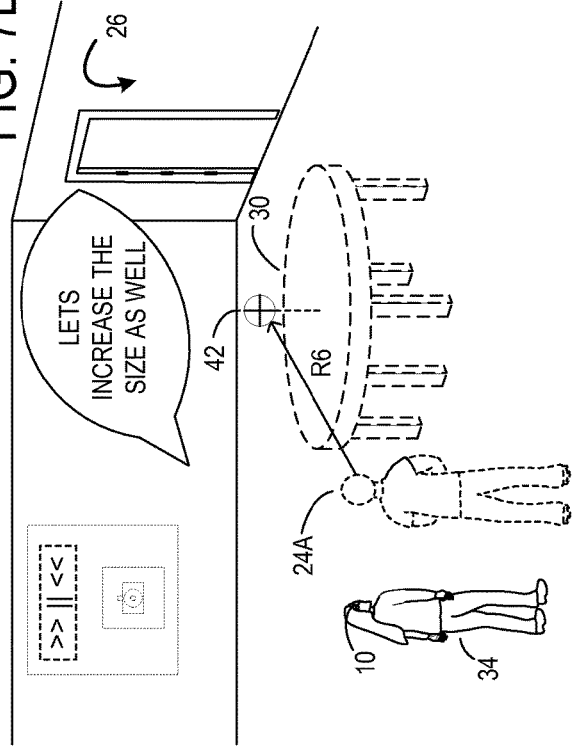

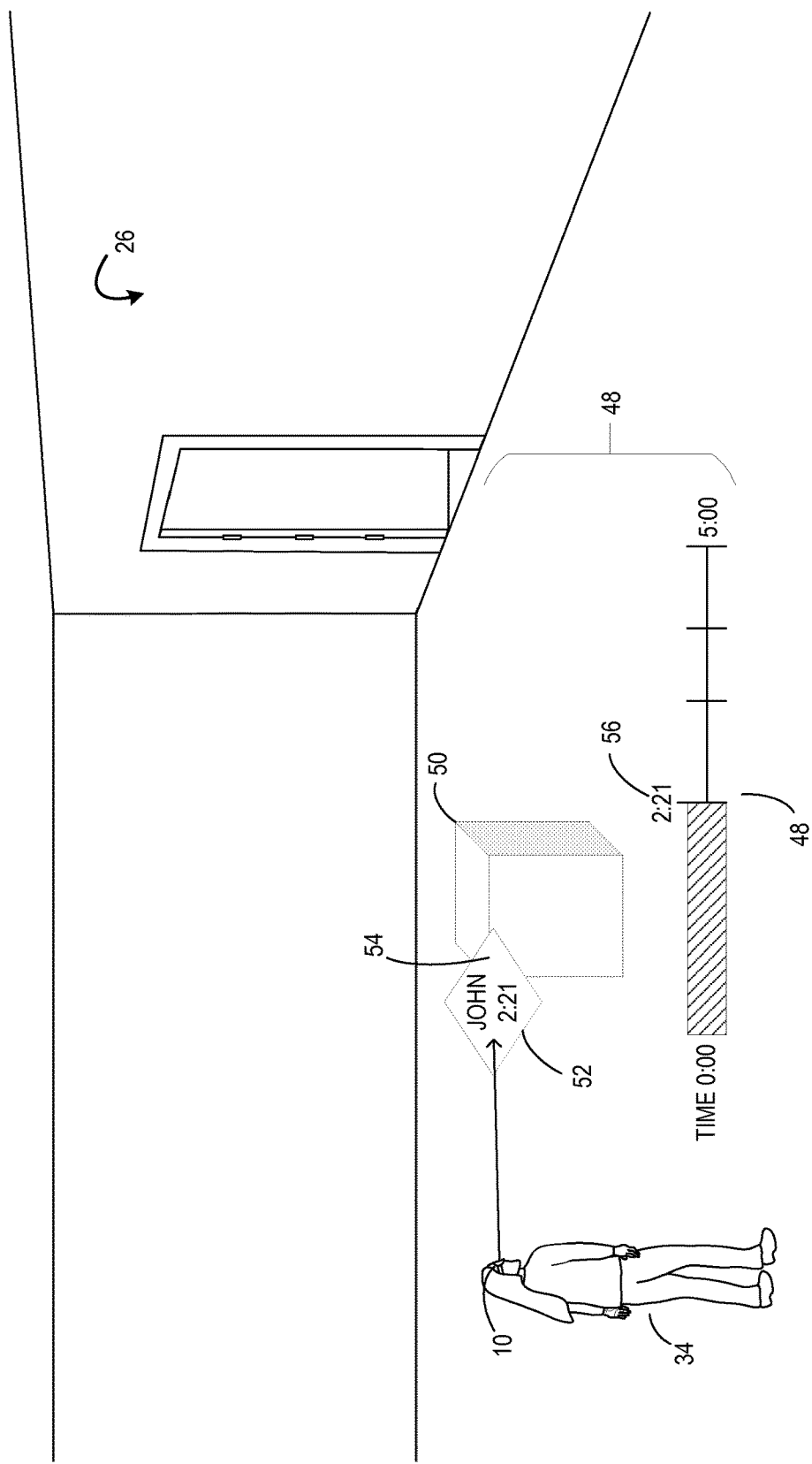

PRODUCING AND CONSUMING METADATA WITHIN MULTI-DIMENSIONAL DATA

BACKGROUND

Production, visualization, and consumption of multi-dimensional data sets has become increasingly important to many enterprises and individuals. As the size and complexity of data sets increases, the ability for the human mind to adequately understand, communicate, and evolve its insights concerning those data sets becomes challenged. In the case of three dimensional data sets, or four dimensional data sets that include time, current technologies typically attempt to communicate the data set by reducing the three or four dimensional data to a representation on a two-dimensional surface. For example, in order to communicate a three dimensional model on the flat surface of a computer screen, the three dimensional model is reduced to a two dimensional image. However, when attempting to view three and four dimensional data sets via such a flat screen, the user is often pushed to the brink of understanding, and often has difficulty identifying, isolating, and annotating particular objects within the three or four dimensional data set.

SUMMARY

To address these issues, a computing system and method for producing and consuming metadata within multi-dimensional data is provided. According to one aspect, the computing system comprises a see-through display, a sensor system, and a processor configured to, in a recording phase, receive, from a first user, a user command to generate an annotation at a location in a three dimensional environment, receive, via the sensor system, a stream of telemetry data recording movement of the first user in the three dimensional environment, receive a message to be recorded from the first user, and store, in memory as annotation data for the annotation, the stream of telemetry data and the message. The processor may further be configured to, in a playback phase, display, to a second user via the see-through display, a visual indicator of the annotation at the location, receive a selection of the visual indicator by the second user, display, to the second user via the see-through display, a simulacrum superimposed onto the three dimensional environment and animated according to the telemetry data, and present, to the second user, the message via the animated simulacrum, via the head mounted display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6A shows a third person perspective view of the first user generating an annotation according to an embodiment of the present description.

FIG. 6B shows a third person perspective view of the first user generating an annotation according to an embodiment of the present description.

FIG. 6C shows a third person perspective view of the first user generating an annotation according to an embodiment of the present description.

FIG. 6D shows a third person perspective view of the first user generating an annotation according to an embodiment of the present description.

FIG. 7A shows a third person perspective view of the second user playing back the annotation according to an embodiment of the present description.

FIG. 7B shows a third person perspective view of the second user playing back the annotation according to an embodiment of the present description.

FIG. 7C shows a third person perspective view of the second user playing back the annotation according to an embodiment of the present description.

FIG. 7D shows a third person perspective view of the second user playing back the annotation according to an embodiment of the present description.

FIG. 8 shows a third person perspective view of the second user viewing a visual indicator displayed at a location and point in time in a virtual scene according to an embodiment of the present description.

DETAILED DESCRIPTION

The present description relates to producing and consuming metadata within multi-dimensional data. More particularly, the present description relates to producing and consuming metadata via a method that includes gathering telemetry data of a first user producing the metadata. Utilizing the gathered telemetry data, a simulacrum of the user can later be generated and animated. With this method, a second user that consumes the metadata may be presented with a simulacrum that communicates where the metadata producing user was standing and looking, as well any hand gestures made during the time that the first user was producing the metadata. Thus, the simulacrum facilitates a more human-like interaction and directs the second user's attention to the locations and objects that are related to the metadata being produced by the first user.

Figure 1:
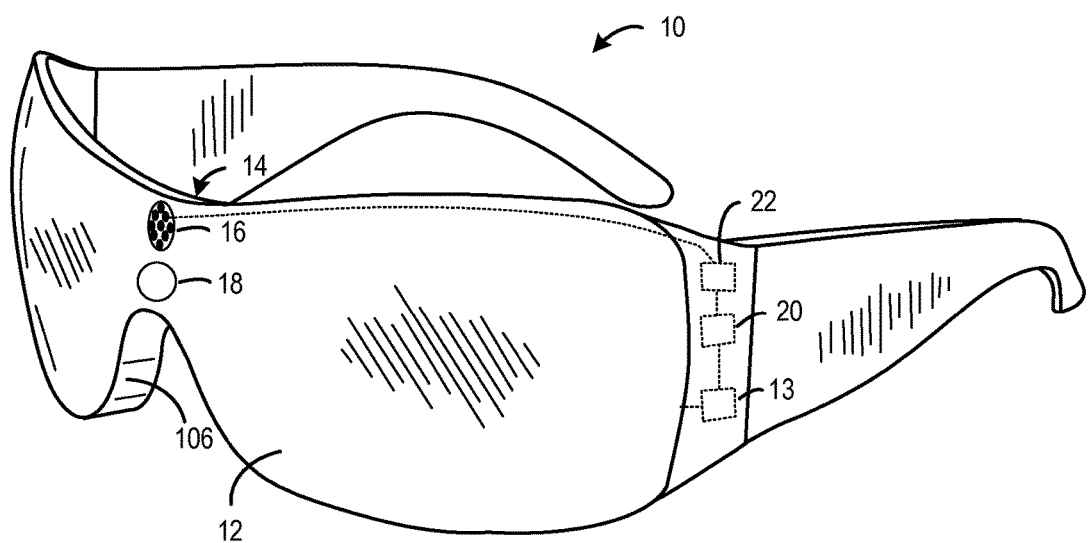
FIG. 1 shows a head mounted display system according to an embodiment of the present description.

FIG. 1 illustrates an example HMD device 10. The illustrated HMD device 10 takes the form of wearable glasses or goggles, but it will be appreciated that other forms are possible. The HMD device 10 includes a see-through stereoscopic display 12 that may be configured to visually augment an appearance of a physical environment being viewed by the user through the see-through stereoscopic display 12.

For example, the HMD device 10 may include an image production system 13 that is configured to display virtual objects to the user with the see-through stereoscopic display 12, which are visually superimposed onto the physical environment so as to be perceived at various depths and locations. In one embodiment, the HMD device 10 may use stereoscopy to visually place a virtual object at a desired depth by displaying separate images of the virtual object to both of the user's eyes. Using this stereoscopy technique, the HMD device 10 may control the displayed images of the virtual objects, such that the user will perceive that the virtual objects exist at a desired depth and location in the viewed physical environment.

The HMD device 10 includes an optical sensor system 14 that may include one or more optical sensors. In one example, the optical sensor system 14 includes an outward facing optical sensor 16 that may be configured to detect the real-world background from a similar vantage point (e.g., line of sight) as observed by the user through the see-through stereoscopic display 12. The optical sensor system 14 may additionally include an inward facing optical sensor 18 that may be configured to detect a gaze direction of the user's eye. It will be appreciated that the outward facing optical sensor 16 may include one or more component sensors, including an RGB camera and a depth camera. The RGB camera may be a high definition camera or have another resolution. The depth camera may be configured to project non-visible light and capture reflections of the projected light, and based thereon, generate an image comprised of measured depth data for each pixel in the image. This depth data may be combined with color information from the image captured by the RGB camera, into a single image representation including both color data and depth data, if desired.

The HMD device 10 may further include a position sensor system 20 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the optical sensor system 14 and/or position sensor information received from position sensor system 20 may be used to assess a position and orientation of the vantage point of the see-through stereoscopic display 12 relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined with an on-board computing system (e.g., on-board computing system 22) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world.

Figure 2:
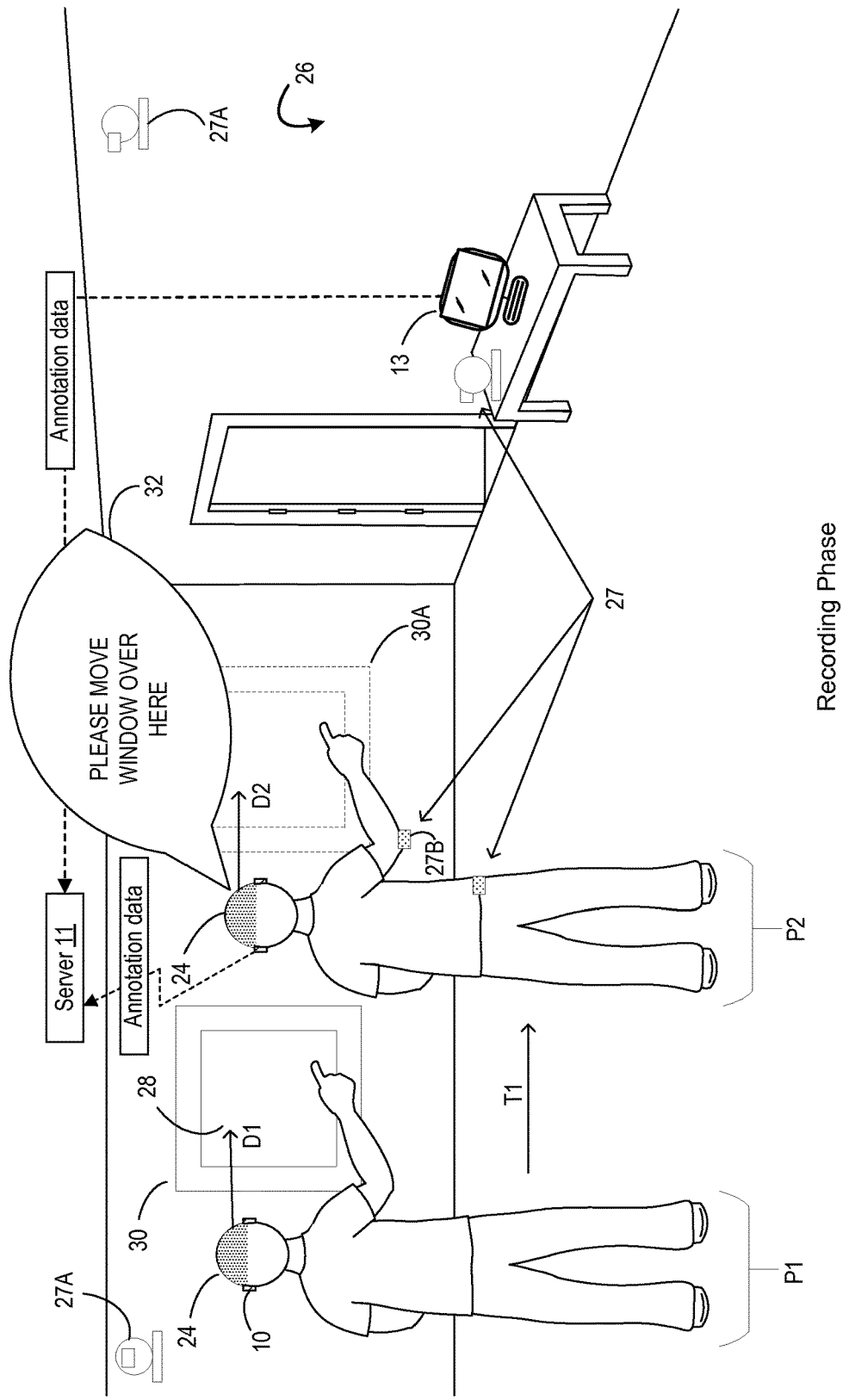
FIG. 2 shows a computing system gathering telemetry data of a first user generating an annotation according to an embodiment of the present description.

FIG. 2 illustrates an example of a user producing metadata. In this example, the first user 24 is standing in the three dimensional environment of the room 26. In this example, the first user 24 inputs a user command to generate an annotation to the head mounted display 10 that is configured to gather a stream of telemetry data of the first user 24 through the optical sensor system 14 and the position sensor system 20. The first user 24 may input the command through various methods, such as a voice command, a hand gesture, or a user input device as a few examples. Optionally or additionally to the head mounted display device 10, the annotation data including the stream of telemetry data and message of first user 24 may be gathered by a distributed sensor system 27 connected to computing system 13 and transmitted to server 11 for storage. FIG. 2 illustrates the distributed sensor system 27 as a motion capture system including a plurality of optical tags 27A worn by the first user 24 (such as an elbow marker and a hip marker), as well as a plurality of cameras 27A placed at known locations around the room to capture images including the optical tags 27A and triangulate the location of the optical tags 27B in the environment. While typical motion capture systems use optical tags and RGB cameras, the distributed sensor system 27 may also use depth cameras and skeletal tracking to track the position of the user. While two markers are shown, additional sensors may be placed at various locations on the user's body.

After receiving the user command to generate an annotation at a location, the user's gaze direction D1 is detected. The location 28 of the annotation is calculated based on an intersection of a recognized object 30, which is a window in the example illustrated in FIG. 2, and the detected gaze direction D1 of the user. It will be appreciated that the head mounted display device 10 includes program logic configured to recognize objects within three dimensional environment 26. In the example illustrated in FIG. 2, the stream of telemetry data is captured as the first user 24 moves from position P1 to position P2 over the duration time T1. Concurrently, a message may be received from the user and recorded. In this example, the message 32 of "Please move window over here", is recorded concurrently with the first user 24 moving from position P1 to positon P2. In an embodiment where first user 24 wears a head mounted display device 10, a virtual representation 30A of the recognized object 30 may be generated and displayed to the first user 24. The location of the virtual representation 30A may be placed based on the detected gaze direction D2 of the first user 24. Next, the stream of telemetry data and the message 32 are stored as annotation data for the generated annotation. Typically this data is stored in non-volatile memory of the head mounted display device. This data may also be periodically sent to and stored in non-volatile memory within a server 11, via a wireless network connection, in order to overcome the storage limitations of a portable device, for example. It will be appreciated that server 11 may be a local server connected via a WLAN, or a remote server connected via a WAN.

Figure 3:
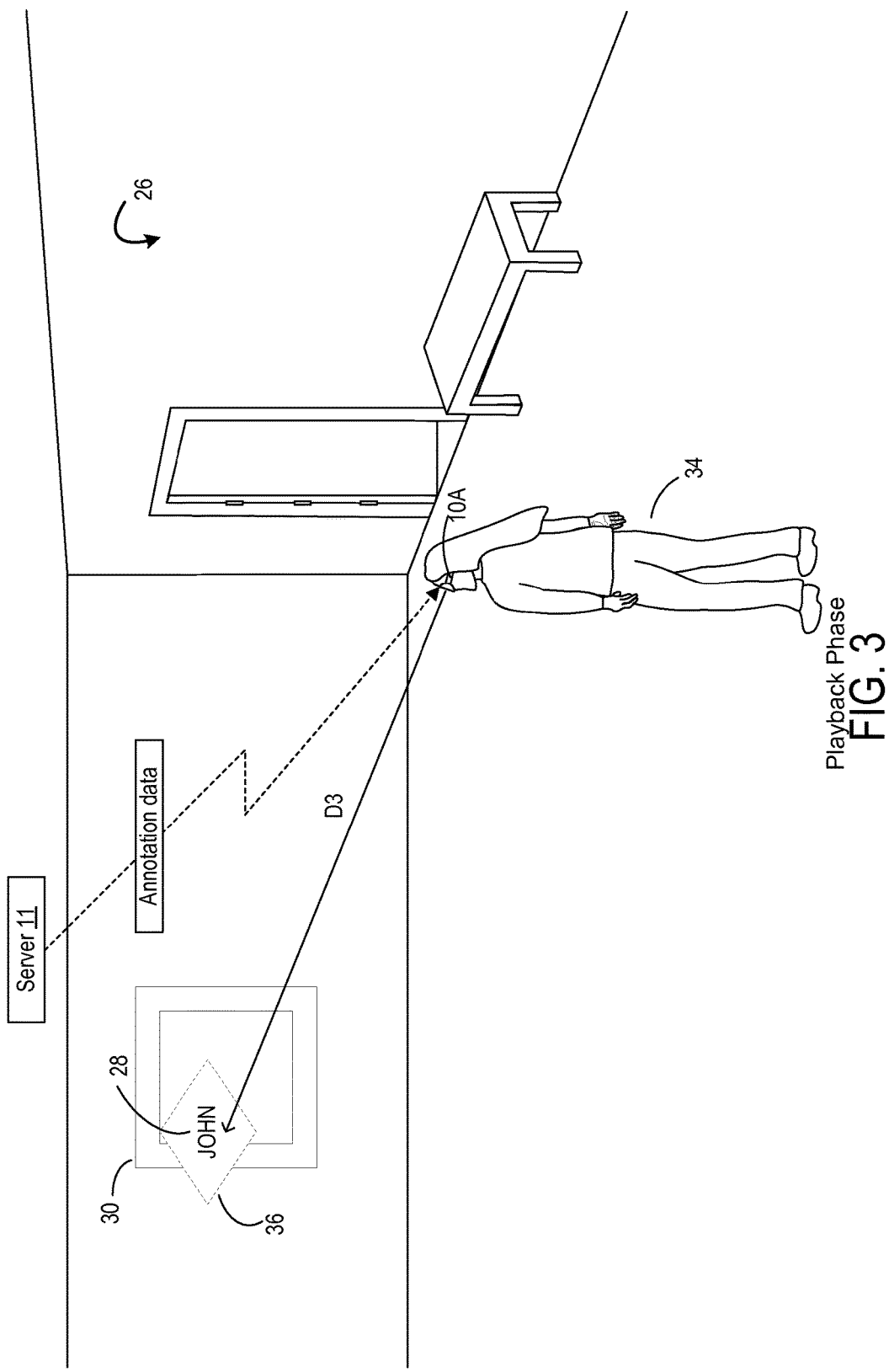
FIG. 3 shows a third person perspective view of a visual indicator displayed to a second user according to an embodiment of the present description.

Now turning to FIG. 3, a second user 34 enters the three dimensional environment 26 at a different time than the first user 24. In this example, the second user 34 is wearing a head mounted display device 10A. Typically head mount display device 10A is different from head mount display device 10, although in some scenarios the same head mount display device may be worn by both the first and second users or may be worn by the same user who engages in both recording and playback of an annotation. The head mount display device 10A downloads annotation data for three dimensional environment 26 from the server 11. As the second user 34 looks in the direction D3, the head mounted display device 10A determines that there is an available annotation at the location 28 that is within the view of the second user 34. Accordingly, the head mounted display device 10A displays a visual indicator 36, which is a hologram, at the location 28 on the see-through display 12 of the head mounted display device 10A. The visual indicator is typically world-locked or object-locked at the location 28, such that the visual indicator 36 appears to stay in the same location 28 of the three dimensional environment as the user walks around. The second user 34 may then select the visual indicator 36 in order to playback the annotation associated with the visual indicator 36. In one example, the selection of the visual indicator 36 is determined based on an intersection between the second user's 34 detected gaze direction D3 and a recognized object 30. In this example, once the user's gaze intersects the visual indicator 36, the user may select the annotation via a predetermined gaze dwell time on the visual indicator, a voice input, a gesture input, or other suitable input. It will be appreciated that although FIG. 3 illustrates the visual indicator 36 as being a diamond shape, virtually any size, shape, or other visual characteristics may be used when generating the visual indicator.

Figure 4:
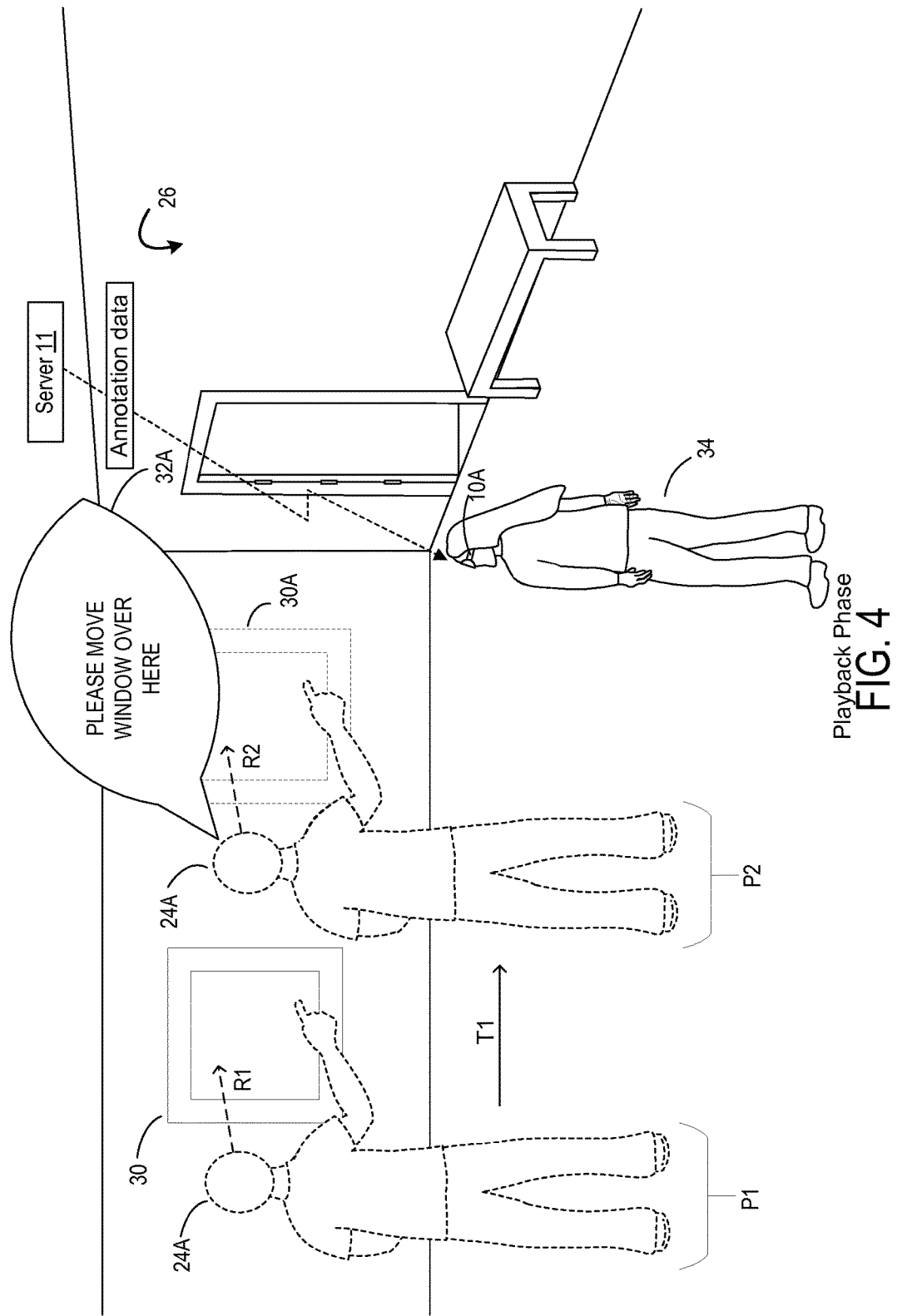
FIG. 4 shows a third person perspective view of a simulacrum displayed to the second user according to an embodiment of the present description.

FIG. 4 illustrates an example of the annotation data stored in FIG. 2 being presented to the second user 34. The annotation data may be retrieved for display from non-volatile memory within the head mount display device 10A itself, or may be downloaded from the server 11. In this example, a simulacrum 24A of the first user 24 is generated and animated according to the telemetry data gathered as the first user 24 produced the annotation. The simulacrum 24A is world-locked to the same position as the first user 24 in the three dimensional environment 26. In the example illustrated in FIG. 4, the simulacrum is displayed to the second user 34 as standing at position P1. In accordance with the telemetry data gathered for the first user 24, the simulacrum 24A is animated as moving from position P1 to position P2 over the time period T1. The simulacrum 24A may also be displayed with a gaze ray R1 that is generated based on the first user's gaze direction data. The gaze ray R1 is displayed to the second user 34 to indicate where the first user 24 was looking over the duration of the annotation, moving from gaze ray direction R1 to gaze ray direction R2. Concurrently with the animation of the simulacrum 24A, the message 32 is presented to the user as message 32A in FIG. 4. It will be appreciated that message 32A may be communicated to the second user 34 over speakers, displayed as text, or through any other appropriate communication medium. With the visual cues afforded by the simulacrum that is presented concurrently with the message, the second user's 34 attention can be directed to exactly the locations intended by the first user 24. In the example illustrated in FIG. 4, the virtual representation 30A of the recognized object 30 that was generated in FIG. 2 may also be displayed to the second user 34.

Figure 5:
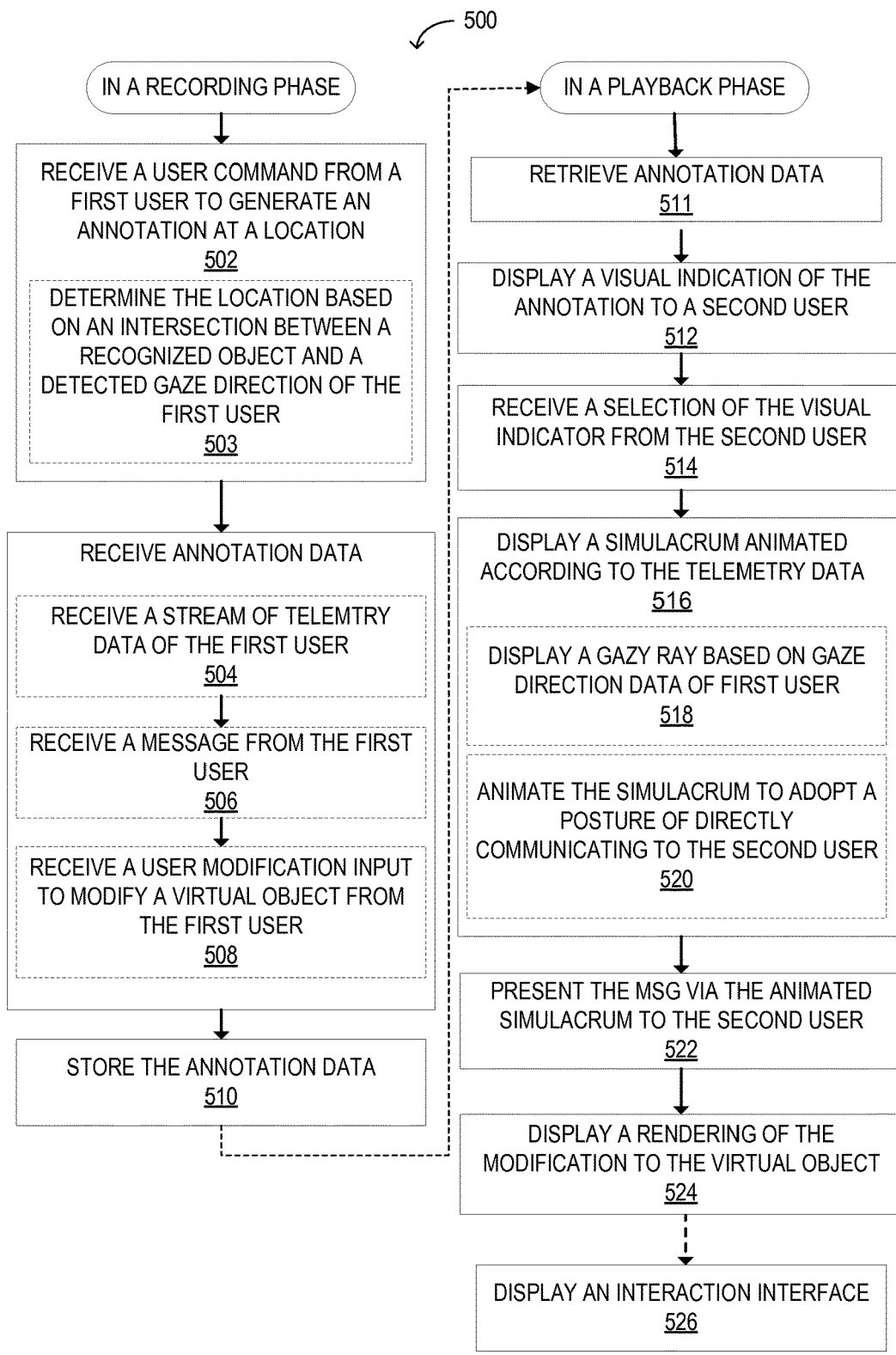
FIG. 5 shows a flow chart of a method for producing and consuming metadata according to an embodiment of the present description.

FIG. 5 shows an example method 500 of generating an annotation in a recording phase and communicating the annotation with a simulacrum in a playback phase. At step 502 in a recording phase, the method 500 may include receiving, from a first user, a user command to generate an annotation at a location in a three dimensional environment. The user command may be inputted through a variety of methods, such as a clicker held by the user, a recognized gesture, or a voice command in a few non-limiting examples. Additionally, in one exemplary embodiment, the three dimensional environment may be a real world environment that the user is standing in. In another embodiment, the three dimensional environment may be an entirely virtual environment or an augmented reality environment that includes a virtual scene that is superimposed onto the real world environment that is a three dimensional environment. In this embodiment, the virtual scene may include a time component, and thus the virtual scene may change over a period of time. For example, the virtual scene may include a visualization hologram of a multi-dimensional data set, wherein the multi-dimensional data set includes a time axis, and thus the visualization hologram that represents the multi-dimensional data set also changes over time. In this embodiment, the annotation is generated at a location and a point in time in the virtual scene.

Additionally, step 502 may include sub-step 503, wherein the location of the annotation in the three dimensional environment may be determined based at least in part on an intersection between a recognized object and a detected gaze direction of the first user. In this embodiment, the recognized object may a physical object that the head mounted display device is able to recognize and track or the recognized object may be a virtual object that is displayed as a visual hologram having a position in the three dimensional environment. For example, the recognized object may be the visualization hologram of the multi-dimensional data set. The recognized object may also combination of a virtual object superimposed onto a physical object. In such a combination, the visuals of the virtual object may selectively occlude portions of the physical object from the view of the first and second users.

Method 500 includes receiving data that will be stored as annotation data for the annotation generated in step 502. Proceeding from step 502 to step 504, the method 500 may include receiving a stream of telemetry data recording movement of the first user in the three dimensional environment. The telemetry data may be gathered by the optical sensor system 14 of the head mounted display device, position sensor system 20, which may be in the head mounted display device 10. Additionally or optionally the telemetry data may be captured through other sensor systems, such as distributed sensor system 27 described above that includes optical tags placed on the user's limbs and cameras placed around the three dimensional environment or a depth camera system configured to perform skeletal tracking on the user, also as described above. The telemetry data may include the user's skeletal position, the user's head orientation, the user's gaze direction, and the users' position in the three dimensional environment as a few non-limiting examples.

Advancing from step 504 to step 506, the method 500 may include receiving a message to be recorded from the first user. The message may be a voice recording of the user, a text based message, or virtually any other variety of metadata. As a list of non-limiting examples, the message may include: historical copies or modification to a data set, tags, notes, emails, symbols, emoticons, video streams, camera clips, music, new virtual objects such as meshes or volumes, drawings, pictures, DICOM, GIS, executable code such as C#, spreadsheets, parametric data, mathematical constructs, abstract data, hyperlinks, access to other data sets and viewing volumes, or personal and product related data. The message may be received via a microphone or other sensors in the head mounted display device 10 or in the distributed sensor system 27.

Proceeding from step 506 to step 508, the method 500 may include receiving a user modification input to modify the virtual object. In an embodiment that includes step 508, the annotation data of the annotation may include the received user modification input. The received user modification input may take the form of a variety of inputs. As a few non-limiting examples, the user modification input may be entered by the user through a hand gesture, a voice command, or a user input device such as a clicker. The user modification input may modify a characteristic of the virtual object, such as the virtual object's size, shape, position, and color as a few examples. Additionally, the user modification input may be an input to a control point associated with the virtual object. For example, the virtual object may include a size control point that can be used to increase or decrease the size of the virtual object. The control point may include a control point hologram that is displayed to the user. In this example, selection of the control point may be determined based on an intersection between the user's detected gaze direction and the control point hologram. In an embodiment that includes a virtual scene with a visualization hologram of a multi-dimensional data set, the user modification input may be an input to modify the visualization hologram or the multi-dimensional data set. These concepts are further illustrated in FIGS. 6D and 7D below.

Advancing to step 510, the method 500 may include storing, in memory as annotation data for the annotation, the stream of telemetry data and the message. In an embodiment that includes step 508, the received user modification input may also be stored as annotation data for the annotation. As described above, the memory is typically non-volatile memory of the head mounted display device 10, and may alternatively be the non-volatile memory of a computing system 13 associated with a distributed sensor system 27. Further, the annotation data may be sent to and stored in an associated server 11 by either the head mount display device 10 or the computing system 13.

Now, in a playback phase, method 500 proceeds to step 511 at which a head mount display devices retrieves the annotation data for a three dimensional environment. This data may be retrieved from on board non-volatile memory, or from a server via a wireless connection for example, in response to detection that the user has entered the three dimensional environment. At step 512, the method includes displaying, via a see-through display of a head mounted display device of a second user, a hologram that is a visual indicator of the annotation at the location, based on the retrieved annotation data. The visual indicator may take virtually any form that visually indicates to the user of the existence of an annotation that is available to be selected. The visual indicator may also include additional information, such as a profile name of the user that produced the annotation as well as a type of metadata stored in the annotation, such as a visual of a speaker to indicate that there is a speech file that the user can listen to. In an embodiment that includes a virtual scene that changes over a period of time, the visual indicator may additionally be displayed at the location and the point in time in the virtual scene determined in step 502. In this embodiment, the visual indicator may be displayed to the second user when the second user is currently viewing the specific point in time in the virtual scene in which the annotation was generated.

Advancing from step 512 to step 514, the method 500 may include receiving a selection of the visual indicator by the second user via the head mounted display device. It will be appreciated that the visual indicator can be selected through a variety of methods. As a few non-limiting examples, the user may select the visual indicator through a voice or gesture command, as well as inputs to an input device such as a hand-held clicker. Gesture input may be detected by the optical sensor system 14. For example, a depth camera may be included in the optical sensor system and configured to recognize predetermined hand gestures that function as gesture commands. As another example, the visual indicator may be selected based on an intersection between the visual indicator and a detected gaze direction of the second user.

Proceeding from step 514 to step 516, the method 500 may include displaying, via the see-through display of the head mounted display device, a hologram of a simulacrum superimposed onto the three dimensional environment and animated according to the telemetry data. It will be appreciated that the simulacrum may take many forms, and is not limited to the specific illustrated examples. In one embodiment, the simulacrum may be an outline of a generic human form. In another embodiment, the simulacrum may be an avatar of the first user, and include additional visual characteristics based on a profile for the first user.

Step 516 may include sub-steps 518 and 520. At sub-step 518, the method 500 may include displaying a gaze ray that is generated based on gaze direction data from the telemetry data of the first user. In one example, the gaze ray may be generated using a ray casting method, wherein a ray is cast from the location of the head mounted display device, towards the direction of the detected gaze direction, to an intersection of the gaze ray and a recognized object. The gaze ray may be displayed to the second user as a dashed arrow in one non-limiting example. It will be appreciated that the gaze ray may take virtually any form that can be used to visually indicate a gaze direction.

At sub-step 520, the method 500 may include further animating the simulacrum to adopt a posture of directly communicating to the second user based on the position and orientation of the simulacrum and the second user in the three dimensional environment. In one example, during generation of the annotation, the first user may desire to directly address the second user. As the first user does not have a priori knowledge of where the second user might be standing in the future, the first user may instead select a function for directly addressing the second user for a desired duration. Although the first user did not have a priori knowledge of the second user's location, the head mounted display device worn by the second user may determine the second user's current location in the three dimensional environment. Accordingly, the positions of the simulacrum and the second user may then be used by the head mounted display device worn by the second user to animate the simulacrum that represents the first user with a posture of directly communicating to the second user, even when the second user's position had been unknown to the first user. In one non-limiting example, adopting a posture of directly communicating to the second user may include animating the simulacrum to turn and directly face the second user.

Advancing to step 522, the method 500 may include presenting the message via the animated simulacrum, via the head mounted display device. As discussed in regards to step 506, the message may be a voice recording of the user, a text based message, or virtually any other variety of metadata. Accordingly, presenting the message may include playing the voice recording, visually displaying the text based message on the head mounted display device as a hologram, or any other presentation medium appropriate for the message. In one embodiment, the message may be presented in synchronization with the animated simulacrum. For example, while generating the annotation, if the first user made a hand gesture while simultaneously speaking a message, then the simulacrum may be animated with the hand gesture concurrently with the message being presented to the second user through speakers on the head mounted display device.

Embodiments that include step 508 of receiving a user modification input to modify a virtual object may also include step 524. At step 524, the method 500 may include displaying a rendering of the modification to the virtual object corresponding to the received user modification input. For example, if the first user inputs a user modification input to increase the size of a virtual object, then a rendering of the modification may include rendering and displaying the virtual object as becoming larger. In an embodiment that includes a virtual scene with a visualization hologram of a multi-dimensional data set, the method 500 may additionally include displaying a rendering of the modification to the visualization hologram of the multi-dimensional data set corresponding to the received user modification input in synchronization with the animated simulacrum.

Simultaneously or separately to the above steps, method 500 may additionally include step 526 of displaying an interaction interface that includes a function selected from the group consisting of adding a direct communication animation, sharing the annotation with another user on a social network, leaving a comment with a nested annotation, capturing a visualization of the three dimensional environment, pausing the playback of the annotation, rewinding the playback of the annotation, fast forwarding the playback of the annotation, and a contextually sensitive function. The interaction interface may be a GUI that is displayed to the user of the head mounted display device. A function of the interaction interface may be selected through a variety of methods, such as a voice command, a detected gaze direction, an input to a user input device, or virtually any other input method.

FIG. 6A illustrates an example where the recognized object 30 is a virtual object that is displayed to the first user 24 on the see-through display 12 of the head mounted display device 10. Additionally, an interaction interface 44 may be displayed to the first user 24 to select a desired function. In the example illustrated in FIG. 6A, the interaction interface 44 has multiple functions that can be selected by the first user 24 including a function to add a direct communication animation that will be stored in the annotation. By adding a direct communication animation, the first user 24 may dictate that the simulacrum that is animated according to the first user's 24 telemetry data will include an animation of adopting a posture of directly communicating to a second user. As the first user 24 does not know where the second user will be standing when the second user views the annotation, the first user would not be able to manually adopt a posture of facing the second user. Accordingly, the direct communication animation will comprise of a designated point in time in the annotation wherein the simulacrum will be animated to turn and face the second user. This animation may be generated and displayed by the head mounted display device worn by the second user that may calculate the second user's position. The direct communication animation may be synchronized with a recorded message that will also be presented to the second user. It will be appreciated that the interaction interface may include many functions, and is not limited to the illustrated examples.

Next, FIG. 6B illustrates the user entering a first user modification input to modify the position of the recognized object 30 in the three dimensional environment 26. In this example, the first user modification input is an input to move the recognized object 30 from position P3 to position P4. The change in position of the recognized object 30 may be determined based on the change in the first user's 24 gaze direction from D3 to D4.

Next, FIG. 6C shows an example of a second user modification input that modifies the recognized object 30 by adding new data. In this example, a new leg 40 is added to the table of recognized object 30. The location of the new leg 40 may be determined based on the detected gaze direction D5 of the first user 24 and the known location of the recognized object 30. In order to more clearly indicate the location of the new leg 40, the first user 24 may make a hand gesture 38. The head mounted display device 10 tracks and recognizes the hand gesture 38 using visual data gathered by optical sensor system 14. The hand gesture 38 is then stored in the stream of telemetry data for the generated annotation. As illustrated in FIG. 6C, the interaction interface may be configured to be contextually sensitive. In this example, as the first user 24 is adding a new leg to the recognized object 30, the interaction interface includes two different types of legs that could be added to the table, a rectangular leg and a cylindrical leg. Utilizing the interaction interface, the first use 24 may select a type of table leg and add that leg to the recognized object 30.

Lastly, FIG. 6D illustrates a third user modification input that modifies a size of the recognized object 30. In this example, the third user modification input is an input to a control point 42 that is associated with the recognized object 30. The control point 42 includes a visual tag that is associated with a function to specifically increase or decrease the size of the recognized object 30 in this specific example. It will be appreciated that control point 42 may be associated with any function to modify the recognized object 30. For example, control point 42 could be associated with a function to change a color, change a position, or change an orientation of the recognized object 30 as a few non-limiting examples. In the example illustrated in FIG. 6D, a selection of the control point 42 may be determined based on an intersection between the visual tag for the control point 42 and a detected gaze direction D6 of the first user 24. After the control point 42 is selected, the first user 42 may input the third user modification input through a variety of methods, such as a voice command, a hand gestures, or a head movement as a few non-limiting examples.

Hereinbelow, FIGS. 6A-7D illustrate a particular use case scenario of the present description. As shown in FIGS. 6A through 6D, the first user 24 may input several messages that are recorded by the head mounted display device 10. The messages may be synced with the user's movements as well as the user modification inputs. It will be appreciated that although three user modification inputs were illustrated, any number of user modification inputs may be considered by the head mounted display device 10. Additionally, it will be appreciated that the user modification inputs are not limited to just moving, adding a leg, and resizing the recognized object 30 as illustrated in FIGS. 6A through 6D, but may modify virtually any desired characteristic of the recognized object 30.

Now turning to FIG. 7A, a playback phase of the annotation generated in FIGS. 6A through 6D is illustrated. After selecting the annotation, the simulacrum 24A is animated according to the stream of telemetry data gathered for the first user 24 and displayed to the second user 34 via the see-through display 12 of the head mounted display device 10. In the example shown in FIG. 7A, the simulacrum is currently animated with a direct communication animation, thus the simulacrum 24A and a gaze ray R3 are displayed as facing the second user, with the gaze ray R3 being directed at the second user 34. In some embodiments, the gaze ray is not generated during a direct communication animation. It will be appreciated that the simulacrum 24A has a known position, which is the same position that the first user 24 had when producing the annotation at that time. While the second user 34 may be standing in any arbitrary location within the three dimensional environment, the second user's 34 current location can be determined by the head mounted display device 10 worn by the second user 34. Accordingly, the head mounted display device 10 may determine the second user's 34 position relative to the position of the simulacrum 24A in the three dimensional environment, and render an animation of the simulacrum adopting a posture of directly communicating to the second user 34. In one embodiment, the animation of adopting a posture of directly communicating to the second user 34 may include a stock animation of turning to directly face the second user 34. In synchronization with this animation, the recorded message may be presented to the second user 34.

Additionally, as illustrated in FIG. 7A, the interaction interface 44 may be displayed to the second user 34. It will be appreciated that the interaction interface 44 may be displayed at any desired location within the three dimensional environment. In the example illustrated in FIG. 7A, the interaction interface includes a function to rewind, pause, and fast forward the annotation. As discussed above, the interaction interface is not limited to these few example functions.

Next, FIG. 7B illustrates the animated simulacrum 24A moving the recognized object 30 to a new position. The gaze rays R3 and R4 are also displayed to the second user 34, showing where the first user 24 was looking as the first user 24 moved the recognized object 30 to the new position. In synchronization with the above animations, the second user 34 is also presented with messages that may be text based, voice recorded, or presented via other communication mediums.

The animation continues in FIG. 7C where the simulacrum 24A may be animated with the hand gesture 38A that represents the hand gesture 38 made by the first user 24. The hand gesture 38A may be synchronized with the gaze ray R5 and a rendering of the modification to recognized object 30, that includes visually adding the new leg 40, as well as a recorded message that is presented to the second user 34.

Finally, the animation concludes in FIG. 7D where the simulacrum 24A indicates, through the displayed gaze ray R6, that a user modification input is being inputted to the control point 42. Additionally, an animation of the recognized object 30 becoming larger is displayed to the second user 24 in synchronization with the animation of the simulacrum 24A and the recorded message being presented.

It will be appreciated that throughout the example illustrated by FIGS. 7A to 7D, the second user 34 may move around the three dimensional environment 26. Even as the second user 34 moves to different positions, the simulacrum 24A and the recognized object have world-locked positions within the three dimensional environment, with the simulacrum's position being determined according to the stream of telemetry data of the first user 24. Accordingly, the second user 34 may move around the three dimensional environment to achieve different viewpoints of the simulacrum 24A and the recognized object 30. As illustrated in FIG. 7D, the second user 34 may move to a position and orientation that is nearly the same as the simulacrum 24A, such that the second user 34 may view the recognized object 30 from the same position and orientation that the first user 24 viewed the recognized object 30 with, thus allowing the second user to step into the first user's shoes, affording the second user 34 better understanding of the first user's 24 viewpoint. On the other hand, as shown in FIG. 7C, the second user 34 may desire to have a better view of the modification being made to the recognized object 30, and therefore view the recognized object 30 from a different position and orientation than the first user 24 viewed the recognized object 30 from. Thus, the second user 34 may view the simulacrum 24A and the recognized object 30 from any desired position and orientation within the three dimensional environment. By determining the position of the second user 34 within the three dimensional environment compared to the position stored in telemetry data for the first user 24 and the position stored for the recognized object 30, an appropriate rendering of the simulacrum 24A and recognized object 30 can be displayed to the second user 34 on the see-through display 12 of the head mounted display 10.

FIG. 8 illustrates an example that includes a virtual scene 48 superimposed onto a three dimensional environment 26, the virtual scene changing over a period of time 48 and including a visualization hologram 50 of a multi-dimensional data set. In this example, the multi-dimensional data set is a four dimensional data set that is modeled by a three dimensional hologram that changes over time. As illustrated in FIG. 8, a first user generated an annotation having a visual indicator 52 with a location 54 and a point in time 56 in the virtual scene 48. The annotation may include a user modification input to modify the visualization hologram 50 or the underlying multi-dimensional data directly. While the second user 34 is viewing the virtual scene 48, a visual indicator 52 is displayed to the second user at the location 54 and point in time 56 in the virtual scene 48. Upon selection of the visual indicator 52, a simulacrum of the first user, a message, and a rendering of the modification to the visualization hologram or multi-dimensional data set may then be displayed to the second user 34 according to the methods discussed above.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
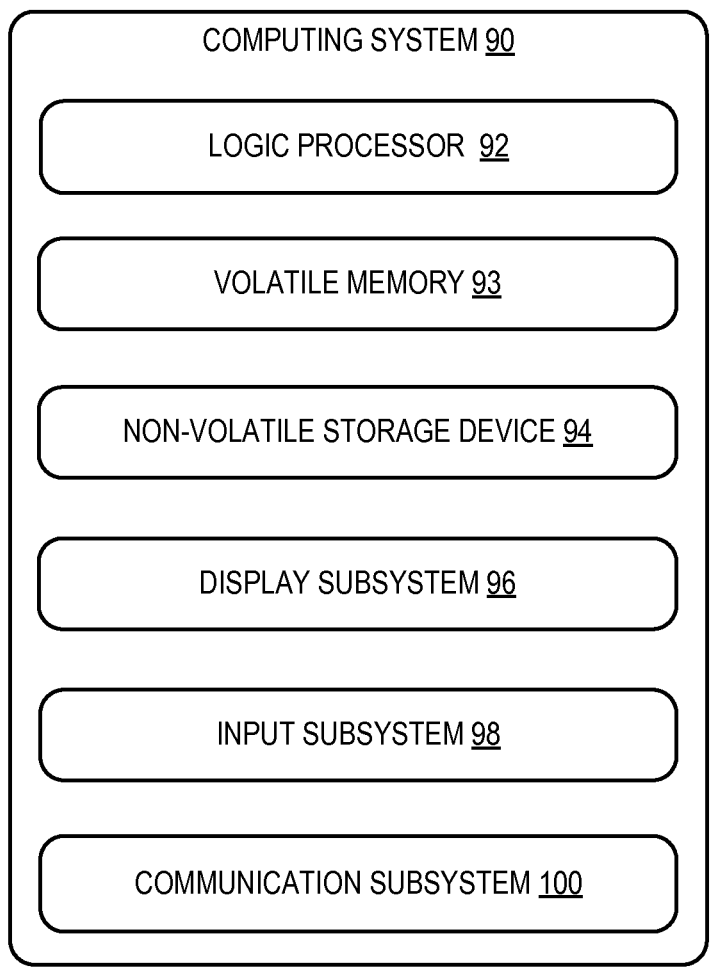
FIG. 9 shows a computing system according to an embodiment of the present description.

FIG. 9 schematically shows a non-limiting embodiment of a computing system 90 that can enact one or more of the methods and processes described above. It will be appreciated in particular that head mounted displays 10, 10A server 11, and computing system 13 each may contain elements of the exemplary computing system 90. Computing system 90 is shown in FIG. 9 in simplified form. Computing system 90 may take the form of one or more head-mounted display devices as shown in FIG. 1, or one or more devices cooperating with a head-mounted display device (e.g., personal computers, server computers, tablet computers, home-entertainment computers, network computing devices, gaming devices, mobile computing devices, mobile communication devices (e.g., smart phone), and/or other computing devices).

Computing system 90 includes a logic processor 92 volatile memory 93, and a non-volatile storage device 94. Computing system 90 may optionally include a display subsystem 96, input subsystem 98, communication subsystem 100, and/or other components not shown in FIG. 9.

Logic processor 92 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 92 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 94 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 94 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 94 may include nonvolatile, dynamic, static, read/write, read-only, sequential-access, location-addressable, file-addressable, and/or content-addressable devices. It will be appreciated that non-volatile storage device 94 is configured to hold instructions even when power is cut to the non-volatile storage device 94.

Volatile memory 93 may include physical devices that include random access memory. Volatile memory 93 is typically utilized by logic processor 92 to temporarily store information during processing of software instructions. It will be appreciated that volatile memory 93 typically does not continue to store instructions when power is cut to the volatile memory 93.

Aspects of logic processor 92, volatile memory 93, and non-volatile storage device 94 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 90 implemented to perform a particular function. In some cases, a module, program, or engine may be instantiated via logic processor 92 executing instructions held by non-volatile storage device 94, using portions of volatile memory 93. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 96 may be used to present a visual representation of data held by non-volatile storage device 94. This visual representation may take the form of a graphical user interface (GUI). As the herein described methods and processes change the data held by the non-volatile storage device, and thus transform the state of the non-volatile storage device, the state of display subsystem 96 may likewise be transformed to visually represent changes in the underlying data. Display subsystem 96 may include one or more display devices utilizing virtually any type of technology. Such display devices may be combined with logic processor 92, volatile memory 93, and/or non-volatile storage device 94 in a shared enclosure, or such display devices may be peripheral display devices. The see-through display of HMD 10 described above is one example of a display subsystem 96.

When included, input subsystem 98 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; any of the sensors described above with respect to position sensor system 18 of FIG. 1; and/or any other suitable sensor.

When included, communication subsystem 100 may be configured to communicatively couple computing system 90 with one or more other computing devices. Communication subsystem 100 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 90 to send and/or receive messages to and/or from other devices via a network such as the Internet.

The following paragraphs provide additional support for the claims of the subject application. One aspect provides a computing system for producing and consuming metadata within multi-dimensional data, comprising: a see-through display, a sensor system, and a processor configured to: in a recording phase: receive, from a first user, a user command to generate an annotation at a location in a three dimensional environment, receive, via the sensor system, a stream of telemetry data recording movement of the first user in the three dimensional environment, receive a message to be recorded from the first user, and store, in memory as annotation data for the annotation, the stream of telemetry data and the message, and in a playback phase: display, to a second user via the see-through display, a visual indicator of the annotation at the location, receive a selection of the visual indicator by the second user, display, to the second user via the see-through display, a simulacrum superimposed onto the three dimensional environment and animated according to the telemetry data, and present, to the second user, the message via the animated simulacrum. The computing system may additionally or alternatively include, wherein the computing system is a head-mounted display device. The computing system may additionally or alternatively include, wherein displaying the simulacrum further comprises displaying a gaze ray that is generated based on gaze direction data from the telemetry data of the first user. The computing system may additionally or alternatively include, wherein the location of the annotation in the three dimensional environment is determined based at least in part on an intersection between a recognized object and a detected gaze direction of the first user. The computing system may additionally or alternatively include, wherein the recognized object is a virtual object that is displayed as a visual hologram having a position in the three dimensional environment. The computing system may additionally or alternatively include, wherein the annotation data further includes a received user modification input to modify the virtual object. The computing system may additionally or alternatively include, wherein the processor is further configured to: in the playback phase, display a rendering of the modification to the virtual object corresponding to the received user modification input. The computing system may additionally or alternatively include, wherein the received user modification input is an input to a control point associated with the virtual object. The computing system may additionally or alternatively include, wherein the simulacrum may be further animated to adopt a posture of directly communicating to the second user based on the position and orientation of the simulacrum and the second user in the three dimensional environment. The computing system may additionally or alternatively include, wherein the processor is further configured to: display an interaction interface that includes a function selected from the group consisting of adding a direct communication animation, sharing the annotation with another user on a social network, leaving a comment with a nested annotation, capturing a visualization of the three dimensional environment, pausing the playback of the annotation, rewinding the playback of the annotation, and fast forwarding the playback of the annotation.

Another aspect provides a method for producing and consuming metadata within multi-dimensional data, comprising: in a recording phase: receiving, from a first user, a user command to generate an annotation at a location in a three dimensional environment, receiving a stream of telemetry data recording movement of the first user in the three dimensional environment, receiving a message to be recorded from the first user, and storing, in memory as annotation data for the annotation, the stream of telemetry data and the message, and in a playback phase: displaying, via a see-through display of a head mounted display device of a second user, a visual indicator of the annotation at the location, receiving a selection of the visual indicator by the second user via the head mounted display device, displaying, via the see-through display of the head mounted display device, a simulacrum superimposed onto the three dimensional environment and animated according to the telemetry data, and presenting the message via the animated simulacrum, via the head mounted display device. The method may additionally or optionally include, wherein displaying the simulacrum further comprises displaying a gaze ray that is generated based on gaze direction data from the telemetry data of the first user. The method may additionally or optionally include, wherein the location of the annotation in the three dimensional environment is determined based at least in part on an intersection between a recognized object and a detected gaze direction of the first user. The method may additionally or optionally include, wherein the recognized object is a virtual object that is displayed as a visual hologram having a position in the three dimensional environment. The method may additionally or optionally include, wherein the annotation data further includes a received user modification input to modify the virtual object. The method may additionally or optionally include, in the playback phase, displaying a rendering of the modification to the virtual object corresponding to the received user modification input. The method may additionally or optionally include, wherein the received user modification input is an input to a control point associated with the virtual object. The method may additionally or optionally include, wherein the simulacrum may be further animated to adopt a posture of directly communicating to the second user based on the position and orientation of the simulacrum and the second user in the three dimensional environment. The method may additionally or optionally include, displaying an interaction interface that includes a function selected from the group consisting of adding a direct communication animation, sharing the annotation with another user on a social network, leaving a comment with a nested annotation, capturing a visualization of the three dimensional environment, pausing the playback of the annotation, rewinding the playback of the annotation, and fast forwarding the playback of the annotation.

Another aspect provides a computing system for producing and consuming metadata within multi-dimensional data, comprising: a see-through display, a sensor system, and a processor configured to: in a recording phase: receive, from a first user, a user command to generate an annotation at a location and a point in time in a virtual scene superimposed on a three dimensional environment, the virtual scene changing over a period of time and including a visualization hologram of a multi-dimensional data set, receive, via the sensor system, a stream of telemetry data recording movement of the first user in the three dimensional environment, receive a message to be recorded from the first user, receive a user modification input to modify the visualization hologram or the multi-dimensional data set, and store, in memory as annotation data for the annotation, the stream of telemetry data, the message, and the user modification input, and in a playback phase: display, to a second user via the see-through display, a visual indicator of the annotation at the location and the point in time in the virtual scene, receive a selection of the visual indicator by the second user, display, to the second user via the see-through display, a simulacrum superimposed onto the three dimensional environment and animated according to the telemetry data, and present, to the second user, the message and a rendering of the modification to the visualization hologram or the multi-dimensional data set in synchronization with the animated simulacrum.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system for producing and consuming metadata within multi-dimensional data, comprising:
a see-through display;
a sensor system; and
a processor configured to:
in a recording phase:
receive, from a first user, a user command to generate an annotation at a location in a three dimensional environment;
receive, via the sensor system, a stream of telemetry data recording movement of the first user in the three dimensional environment;
receive a message to be recorded from the first user;
receive, from the first user, a second user command to add a stock animation at a designated point in time during the message, wherein the stock animation includes at least a direct communication animation; and
store, in memory as annotation data for the annotation, the stream of telemetry data and the message;
in a playback phase:
display, to a second user via the see-through display, a visual indicator of the annotation at the location;
receive a selection of the visual indicator by the second user;
display, to the second user via the see-through display, a simulacrum of the first user superimposed onto the three dimensional environment and animated according to the telemetry data and animated to include the stock animation at the designated point in time during the message, wherein to animate the simulacrum with the direct communication animation the simulacrum is animated to adopt a posture of directly communicating to the second user based on a position and orientation of the simulacrum relative to a position and orientation of the second user in the three dimensional environment; and
present, to the second user, the message via the animated simulacrum.

2. The computing system of claim 1, wherein the computing system is a head-mounted display device.

3. The computing system of claim 1, wherein displaying the simulacrum further comprises displaying a gaze ray that is generated based on gaze direction data from the telemetry data of the first user.

4. The computing system of claim 1, wherein the location of the annotation in the three dimensional environment is determined based at least in part on an intersection between a recognized object and a detected gaze direction of the first user.

5. The computing system of claim 4, wherein the recognized object is a virtual object that is displayed as a visual hologram having a position in the three dimensional environment.

6. The computing system of claim 5, wherein the annotation data further includes a received user modification input to modify the virtual object.

7. The computing system of claim 6, wherein the processor is further configured to: in the playback phase, display a rendering of the modification to the virtual object corresponding to the received user modification input.

8. The computing system of claim 6, wherein the received user modification input is an input to a control point associated with the virtual object.

9. The computing system of claim 1, wherein the processor is further configured to: display an interaction interface that includes a function selected from the group consisting of adding the direct communication animation, sharing the annotation with another user on a social network, leaving a comment with a nested annotation, capturing a visualization of the three dimensional environment, pausing the playback of the annotation, rewinding the playback of the annotation, and fast forwarding the playback of the annotation.

10. A method for producing and consuming metadata within multi-dimensional data, comprising:
in a recording phase:
receiving, from a first user, a user command to generate an annotation at a location in a three dimensional environment;
receiving a stream of telemetry data recording movement of the first user in the three dimensional environment;
receiving a message to be recorded from the first user;
receiving, from the first user, a second user command to add a stock animation at a designated point in time during the message, wherein the stock animation includes at least a direct communication animation; and
storing, in memory as annotation data for the annotation, the stream of telemetry data and the message;
in a playback phase:
displaying, via a see-through display of a head mounted display device of a second user, a visual indicator of the annotation at the location;
receiving a selection of the visual indicator by the second user via the head mounted display device;
displaying, via the see-through display of the head mounted display device, a simulacrum of the first user superimposed onto the three dimensional environment and animated according to the telemetry data and animated to include the stock animation at the designated point in time during the message, wherein to animate the simulacrum with the direct communication animation the simulacrum is animated to adopt a posture of directly communicating to the second user based on a position and orientation of the simulacrum relative to a position and orientation of the second user in the three dimensional environment; and
presenting the message via the animated simulacrum, via the head mounted display device.

11. The method of claim 10, wherein displaying the simulacrum further comprises displaying a gaze ray that is generated based on gaze direction data from the telemetry data of the first user.

12. The method of claim 10, wherein the location of the annotation in the three dimensional environment is determined based at least in part on an intersection between a recognized object and a detected gaze direction of the first user.

13. The method of claim 12, wherein the recognized object is a virtual object that is displayed as a visual hologram having a position in the three dimensional environment.

14. The method of claim 13, wherein the annotation data further includes a received user modification input to modify the virtual object.

15. The method of claim 14, further comprising, in the playback phase, displaying a rendering of the modification to the virtual object corresponding to the received user modification input.

16. The method of claim 15, wherein the received user modification input is an input to a control point associated with the virtual object.

17. The method of claim 10, further including displaying an interaction interface that includes a function selected from the group consisting of adding the direct communication animation, sharing the annotation with another user on a social network, leaving a comment with a nested annotation, capturing a visualization of the three dimensional environment, pausing the playback of the annotation, rewinding the playback of the annotation, and fast forwarding the playback of the annotation.

18. A computing system for producing and consuming metadata within multi-dimensional data, comprising:
 a see-through display;
 a sensor system; and
 a processor configured to:
  in a recording phase:
   receive, from a first user, a user command to generate an annotation at a location and a point in time in a virtual scene superimposed on a three dimensional environment, the virtual scene changing over a period of time and including a visualization hologram of a multi-dimensional data set;
   receive, via the sensor system, a stream of telemetry data recording movement of the first user in the three dimensional environment;
   receive a message to be recorded from the first user;
   receive, from the first user, a second user command to add a stock animation at a designated point in time during the message, wherein the stock animation includes at least a direct communication animation;
   receive a user modification input to modify the visualization hologram or the multi-dimensional data set; and
   store, in memory as annotation data for the annotation, the stream of telemetry data, the message, and the user modification input;
  in a playback phase:
   display, to a second user via the see-through display, a visual indicator of the annotation at the location and the point in time in the virtual scene;
   receive a selection of the visual indicator by the second user;
   display, to the second user via the see-through display, a simulacrum of the first user superimposed onto the three dimensional environment and animated according to the telemetry data and animated to include the stock animation at the designated point in time during the message, wherein to animate the simulacrum with the direct communication animation the simulacrum is animated to adopt a posture of directly communicating to the second user based on a position and orientation of the simulacrum relative to a position and orientation of the second user in the three dimensional environment; and
   present, to the second user, the message and a rendering of the modification to the visualization hologram or the multi-dimensional data set in synchronization with the animated simulacrum.

* * * * *